Patented Nov. 11, 1947

2,430,822

UNITED STATES PATENT OFFICE 2,430,822

CHLORINATION OF ISOPROPYLBENZENES

John A. Nevison, Lansdowne, Pa., assignor to The Atlantic Refining Company, Philadelphia, Pa., a corporation of Pennsylvania No Drawing. Application April 28, 1944,
Serial No. 533,263

5 Claims. (Cl. 260—651)

This invention relates to the chlorination of isopropyl benzenes to stable chlorinated products having viscosity and volatility characteristics particularly adapting them for use in the fire and water proofing of fabrics.

While considerable work has been done heretofore on the chlorination of the isopropyl benzenes, most of the investigators have been interested in preparing ring chlorinated compounds rather than compounds chlorinated in the side chain or chains, although the preparation of alphachlorocumene (alpha-chloromonoisopropyl benzene) and betachlorocumene (beta-chloromonoisopropyl benzene) has been reported. The ring chlorinated compounds, while of good stability, require the use of catalysts for their preparation and moreover are too volatile to be useful in the processing of fabrics such as canvas which may be exposed to atmospheric influences over long periods of time, while the monochlorocumenes possess poor stability, particularly betachlorocumene in which compound the chlorine atom is attached to the tertiary carbon atom in the side chain. It will be understood that one of the most important characteristics of a chlorinated hydrocarbon in most applications is its stability as measured by the amount of HCl which splits off from the molecule.

I have now discovered that stable chlorinated products possessing excellent viscosity and volatility characteristics from the standpoint of their use in the impregnation of fabrics to render them water and fire proof may be prepared from the isopropyl benzenes or their ring chlorinated derivatives by chlorinating these compounds in the side chain or chains with an amount of chlorine corresponding to a minimum of about 3 chlorine atoms for each tertiary side chain carbon atom.

The products of the chlorination according to the invention are believed to conform with the formula,

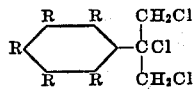

in which R may be hydrogen, chlorine, or

I attribute the stability of my chlorinated products to the fact that each chlorine atom on a tertiary side chain carbon atom is surrounded by chlorine attached to the adjacent carbon atoms. Thus, there being no readily available hydrogen to react with the chlorine on the tertiary carbon atom or atoms to form HCl, the configuration is stable. My products range from heavy viscous liquids to solids depending upon the number of trichlorisopropyl groups in the molecule. When employed in the treatment of fabrics, they may be used as such, in which case most of them must be heated to render them sufficiently fluid for application or they may be dissolved in solvents or compounded with other materials.

Isopropyl benzenes employed according to the invention may be prepared, for example, by the alkylation of benzene with propylene using a catalyst consisting of a calcined mixture of a phosphoric acid and a finely divided solid adsorbent such as diatomaceous earth, kieselguhr, fuller's earth, bentonite and the like. The alkylation reaction is usually executed at a temperature between 350° F. and 600° F. and under a superatmospheric pressure of, for example, 400 to 1800 pounds per square inch. Temperatures within the range 400° F. to 500° F. and the use of a mol ratio of benzene to propylene of from 2:1 to 10:1, preferably 5:1, favor the production of monoisopropyl benzene while higher operating temperatures, i. e., temperatures of the order of 525° F. to 600° F. and the use of substantially equimolecular proportions of benzene and propylene favor the production of polyisopropyl benzenes.

The chlorination according to the invention is usually, and preferably, effected without the aid of a catalyst, but catalysts such as activated carbon, non-volatile organic bases such as diethylamine, dibenzylamine, pyridine, etc., may be used. The use of catalysts such as iron, iodine, and aluminum chloride is, of course, to be avoided since these promote ring substitution. If desired, chlorinating agents other than elemental chlorine may be employed in the chlorination. Thus sulfuryl chloride may be used, preferably in conjunction with an organic peroxide catalyst, such as benzoyl peroxide, lauroyl peroxide, heptoyl peroxide, octoyl peroxide, peroxidized benzaldehyde and the like. In general the presence of sulfur favors side chain substitution and increases the yield of the desired product.

Despite representations to the contrary in the patent and other literature, I have not found it necessary to carry out the chlorination under the influence of light when operating in the preferred manner without the aid of a chlorination catalyst.

As previously indicated herein, compounds within the scope of the invention may contain chlorine in the aromatic nucleus as well as in the side chain. The nuclear substitution is preferably effected prior to the side chain substitution but may be effected subsequent thereto in which case the use of a solvent such as trichlorbenzene, carbon tetrachloride, etc., is usually necessary.

The relative greater stability of chlorinated isopropyl benzenes prepared according to the invention as compared with chlorinated isopropyl benzenes containing fewer or no side chain chlorine atoms is illustrated by the accompanying table. In each case of side chain substitution the chlorinated material was prepared by simply bubbling chlorine through the hydrocarbon or ring chlorinated hydrocarbon, the temperature of the reaction being maintained between 150° F. and 250° F. by controlling the rate of introduction of the chlorine. Following the introduction of the desired number of chlorine atoms as marked by the increase in weight of the material being worked, traces of by-product HCl and unreacted chlorine were removed by air blowing. The stability test (last column of the table) is performed by heating a 25 gram sample of the chlorinated material in a 250 cc. Erlenmeyer flask at a temperature of 285° F. for a period of 16 hours and measuring the amount of HCl evolved.

the preparation of lubricants adapted to lubricating bearing surfaces subjected to exceedingly high pressures.

I claim:

1. A chlorinated isopropyl benzene in which a chlorine atom has been substituted for hydrogen on each side chain carbon atom.

2. Trichlormonoisopropyl benzene with a chlorine atom attached to each side chain carbon atom.

3. Hexachlordi-isopropyl benzene with a chlorine atom attached to each side chain carbon atom.

4. The method of producing a stable chlorinated product having viscosity and volatility characteristics particularly adapting it for use in the treatment of fabrics to render them water and fire proof, which comprises contacting a compound from the group consisting of mono- and poly-isopropyl benzenes and their nuclearly chlorinated derivatives with a chlorinating agent at a temperature between 150° F. and 250° F. for a period of time sufficient to substitute a chlorine atom for hydrogen on each side chain carbon atom.

5. The method of producing a stable chlorinated product having viscosity and volatility char-

*Stability of chlorinated isopropyl benzenes*

| Experiment Number | Stock Chlorinated | Boiling Range (° F.) of Stock | Total Weight per cent Chlorine | Per cent Chlorine | | Average Number Side Chain Cl atoms per mol. | Average Number Side Chain Tertiary Carbon Atoms per mol. | Average Number Cl atoms per Tertiary Carbon (side chains only) | Stability, mg. HCl/25 gm. |
|---|---|---|---|---|---|---|---|---|---|
| | | | | On Ring | On Side Chain | | | | |
| 1 | Diisopropyl Benzene | 390–410 | 41.8 | | All | 3.2 | 2 | 1.6 | 450+ |
| 2 | ----do---- | 390–410 | 48.7 | | All | 4.2 | 2 | 2.1 | 450+ |
| 3 | ----do---- | 390–410 | 59.1 | | All | 6.3 | 2 | 3.1 | 22 |
| 4 | ----do---- | 390–410 | 60.0 | | All | 6.4 | 2 | 3.2 | 18 |
| 5 | Isopropyl Benzene | 290–310 | 42.2 | | All | 2.4 | 1 | 2.4 | 300+ |
| 6 | ----do---- | 290–310 | 51.0 | | All | 3.0 | 1 | 3.0 | 6 |
| 7 | Diisopropyl Benzene | 350–510 | 45.3 | All | | | 2 | | 34 |
| 8 | ----do---- | 350–510 | 61.8 | 8.7 | 53.1 | 6.0 | 2 | 3.0 | 9 |

It is to be noted that while the product chlorinated in the aromatic nucleus only as through the use of iron catalyst (Exp. No. 7) shows good stability as compared with the side chain chlorinated compounds containing a lesser amount of chlorine than called for by the invention (Exp. Nos. 1, 2 and 5), it is less stable than any of the products within the scope of the invention (Exp. Nos. 3, 4, 6 and 8) and that its stability is markedly increased when it is treated according to the invention (Exp. No. 8).

In the commercial application of the present invention, I prefer to use a polyisopropyl benzene such as di- or tri-isopropyl benzene or a mixture of these rather than monoisopropyl benzene which is exceedingly valuable for use in the production of high octane aviation fuels. Ordinarily, I employ polyisopropyl benzenes produced incident to the alkylation of benzene with propylene under the conditions hereinbefore mentioned as favoring the production of monoisopropyl benzene. Thus, in one of its aspects, my invention provides for the practical utilization of by-product materials.

Although my chlorinated isopropyl benzenes are particularly useful in the fire and water proofing of fabrics, they may find application in other fields, for example, they may be found useful in acteristics particularly adapting it for use in the treatment of fabrics to render them water and fire proof, which comprises contacting a compound from the group consisting of mono- and polyisopropyl benzenes and their nuclearly chlorinated derivatives with chlorine at a temperature between 150° F. and 250° F. for a period of time sufficient to substitute a chlorine atom for hydrogen on each side chain carbon atom, and removing hydrogen chloride from the product.

JOHN A. NEVISON.

REFERENCES CITED

The following references are of record in the file of this patent:

UNITED STATES PATENTS

| Number | Name | Date |
|---|---|---|
| 1,828,858 | Conklin | Oct. 27, 1931 |

FOREIGN PATENTS

| Number | Country | Date |
|---|---|---|
| 448,851 | Great Britain | June 10, 1936 |

OTHER REFERENCES

Truffault—"Comptes Rendues," vol. 202, pages 1286–9 (1936).